United States Patent

[11] 3,573,784

[72] Inventors Henry L. Bachofer
Newtown Square, Pa. (Sun Oil Company, Bishop Hollow Road, Newtown Square, Pa. 19073);
Elbert N. Shawhan, West Chester, Pa. (Sun Oil Company, Bishop Hollow Raod, Newtown Square, Pa. 19073)
[21] Appl. No. 764,549
[22] Filed Oct. 2, 1968
[45] Patented Apr. 6, 1971

[54] METAL DETECTING APPARATUS FOR CONVEYOR BELT
15 Claims, 8 Drawing Figs.
[52] U.S. Cl. ................................................ 340/258, 324/41, 340/259
[51] Int. Cl. ........................................... G08b 21/00, G01n 33/12
[50] Field of Search .......................... 340/258, 258 (D), 258 (C), 259; 324/38 (L), 41, 34

[56] References Cited
UNITED STATES PATENTS
2,943,306  6/1960  Gray et al. .................... 340/258
3,020,470  2/1962  Shawan et al. ................ 324/41X
3,020,475  2/1962  Walton ........................... 324/41
3,159,826  12/1964 Morrison ........................ 340/258
3,371,272  2/1968  Stanton ......................... 340/258X
3,395,341  7/1968  Malaquin ....................... 340/258X
3,436,649  4/1969  Takechi et al. ................. 340/38
3,465,241  9/1969  Metzger et al. ................ 324/34X Primary Examiner—Donald J. Yusko
Assistant Examiner—Perry Palan
Attorneys—George L. Church, Donald R. Johnson, Wilmer E. McCorquodale, Jr. and Frank A. Rechif ABSTRACT: For detecting metal traveling along a conveyor belt, an excitation coil and a pair of pickup coils are positioned adjacent the belt. A signal voltage is induced in the pickup coils whenever a metallic body passes by such coils. Direct pickup from the excitation coil by the pickup coils is reduced to a minimum by means of a bucking voltage which is automatically adjusted in phase and amplitude. A separate detecting means automatically reduces the sensitivity of the indicating means whenever a metallic nonuniformity in the belt itself passes by the pickup coils.

PATENTED APR 6 1971 3,573,784
SHEET 1 OF 5
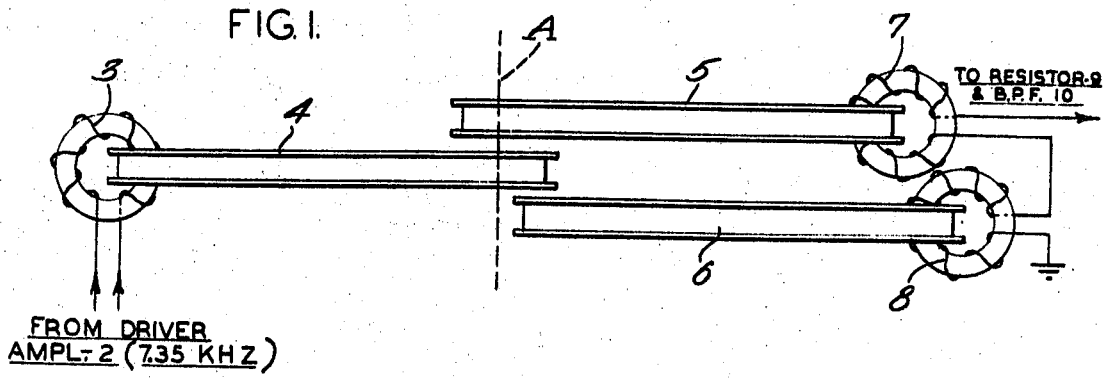
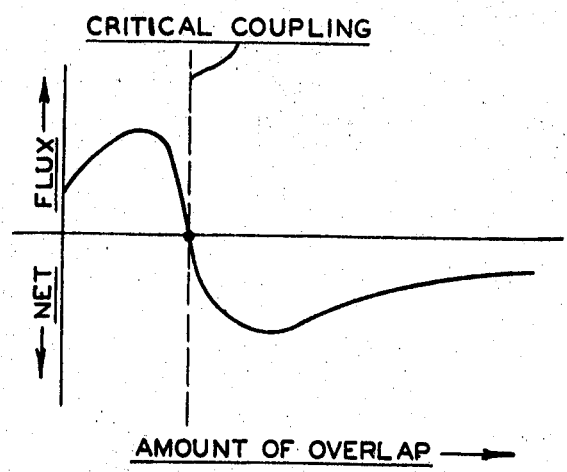
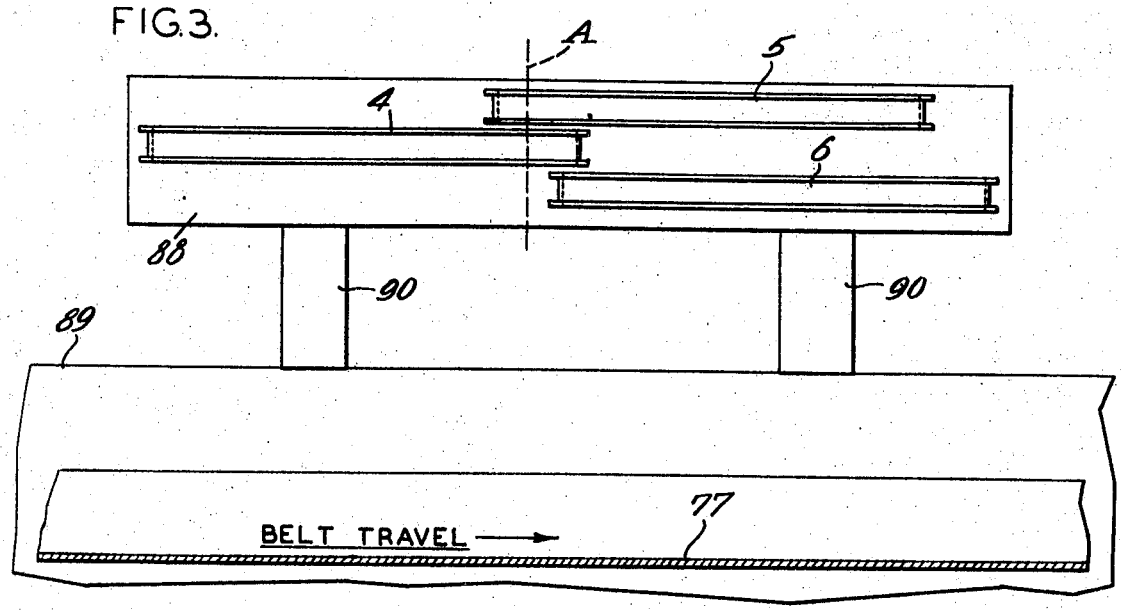
INVENTORS:
HENRY L. BACHOFER
ELBERT N. SHAWHAN
BY Donald R. Johnson
ATTY.

INVENTORS:
HENRY L. BACHOFER
ELBERT N. SHAWHAN
BY Donald R. Johnson
ATTY.

FIG. 8.

METAL DETECTING APPARATUS FOR CONVEYOR BELT

This invention relates to metal detecting apparatus, and more particularly to apparatus for detecting the presence of "tramp" metal (metal fortuitously present) on a conveyor belt.

In the northern region of the Province of Alberta, Canada, an orebody of so-called tar sand is being mined and transported to a processing plant for extraction of a valuable petroleum material therefrom. The mining is done by the utilization of a large bucketwheel, and the mined material is dumped onto a wide and long conveyor belt for transportation of such material to the processing plant.

It is known that metal drill casing was left in the orebody now being mined, after previous attempts to produce oil from the tar sand. The location of this drill casing is not known. Jagged pieces of this pipe or casing, torn out by the bucketwheel, could cause serious damage to the long sections of the con conveyor belt, since they would tend to cause lengthwise rips that could not be repaired. It is therefore important to detect metallic bodies, which may be fortuitously present on the conveyor belt, before they can seriously damage such belt.

Therefore, an object of this invention is to provide a novel metal detecting apparatus.

Another object is to provide a novel apparatus for detecting the presence of a metallic body traveling at a known rate through a detection zone.

A further object is to provide a novel apparatus for detecting the presence of tramp metal on a conveyor belt.

In order to provide the necessary strength, the conveyor belt is reinforced with steel cables which extend throughout its length. Furthermore, at intervals in the belt there are splices and patches, at which locations the reinforcing cables are spaced at double density. In addition to this, large masses of metal (e.g., metallic parts, tools, etc.) are moved near the belt during normal operation. Moreover, it is desired to detect either ferrous or nonferrous metal on the belt. Also, the high rate of movement of mined material on the belt (for example 3 million tons per month, or considerably one 1 ton per second), together with the presence of rock, etc., causes a considerable amount of vibration and shock to be set up.

Accordingly, still another object of the invention is to provide a metal detecting apparatus which will detect the presence of only tramp metal on a conveyor belt, in the presence of reinforcing metal contained in the belt itself, and in the presence of metal which may be moving in the vicinity of the belt but which is not on the belt.

A still further object is to provide novel metal detecting apparatus for a conveyor belt which will detect either a ferrous or a nonferrous metal body on the belt.

Yet another object is to provide novel metal detecting apparatus for a conveyor belt wherein the coil structure, which is positioned adjacent the belt, is of extremely rigid construction.

The foregoing and other objects of the invention are accomplished, briefly, in the following manner: A rigid one-turn excitation coil and a pair of rigid one-turn pickup coils are mounted above a conveyor belt, with the pickup coils located on respective opposite sides of the critical coupling position with respect to the excitation coil. Direct pickup from the excitation coil by the pickup coils is reduced to a minimum by means of a bucking voltage which is automatically adjusted in phase and amplitude through the operation of a self-balancing system, the time constant of this system being in excess of the time required for a metallic body on the conveyor belt to move past the pickup coils. An indicating (alarm) circuit is operated by the signal voltage output of the pickup coils. A separate coil, located below the belt, produces a voltage in response to the passage of a belt patch or splice past such coil, and this voltage is utilized to reduce the sensitivity of the indicating circuit during the passage of this belt or splice past the pickup coils.

A detailed description of the invention follows, taken in conjunction with the accompanying drawings, wherein:

FIG. 1 is a diagrammatic illustration of three overlapping one-turn coils utilized in the invention;

FIG. 2 is a graph representing the variation of magnetic flux with overlap of two coils;

Figure 4:
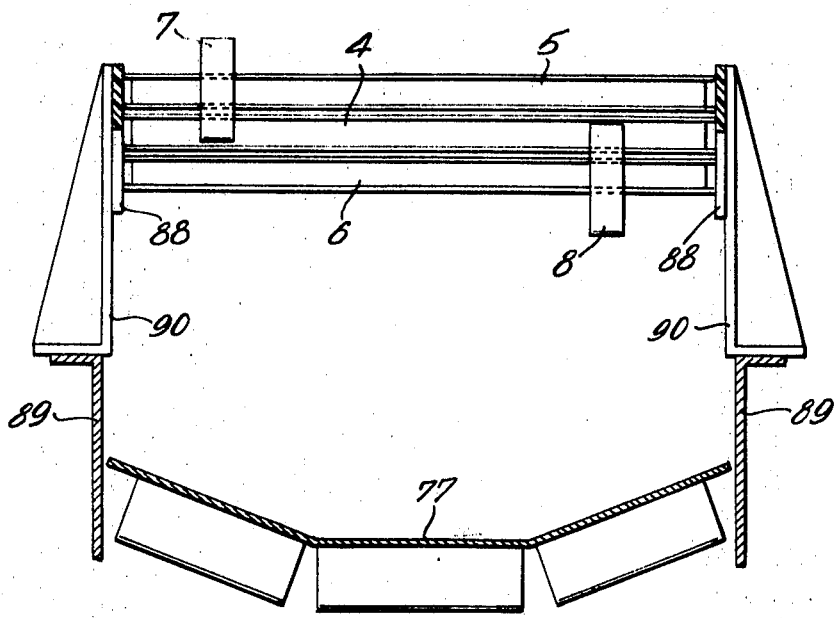
Figure 5:
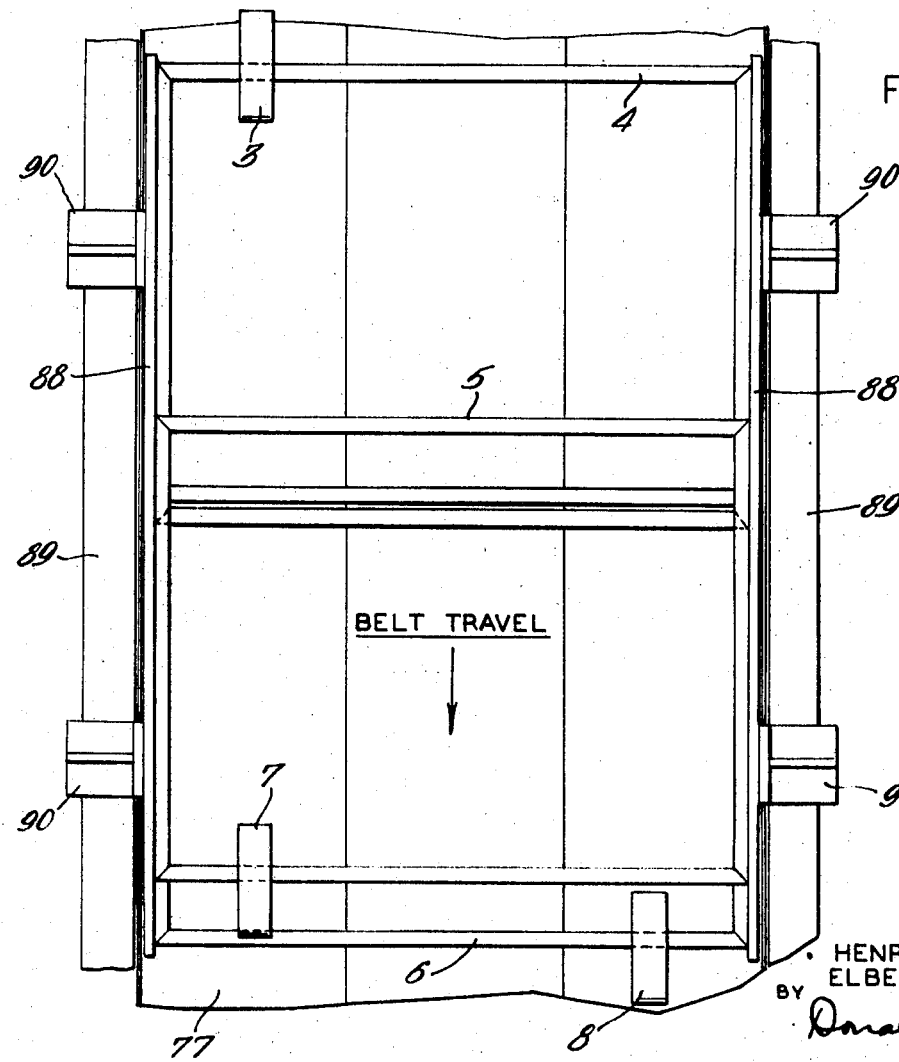
Figure 6:
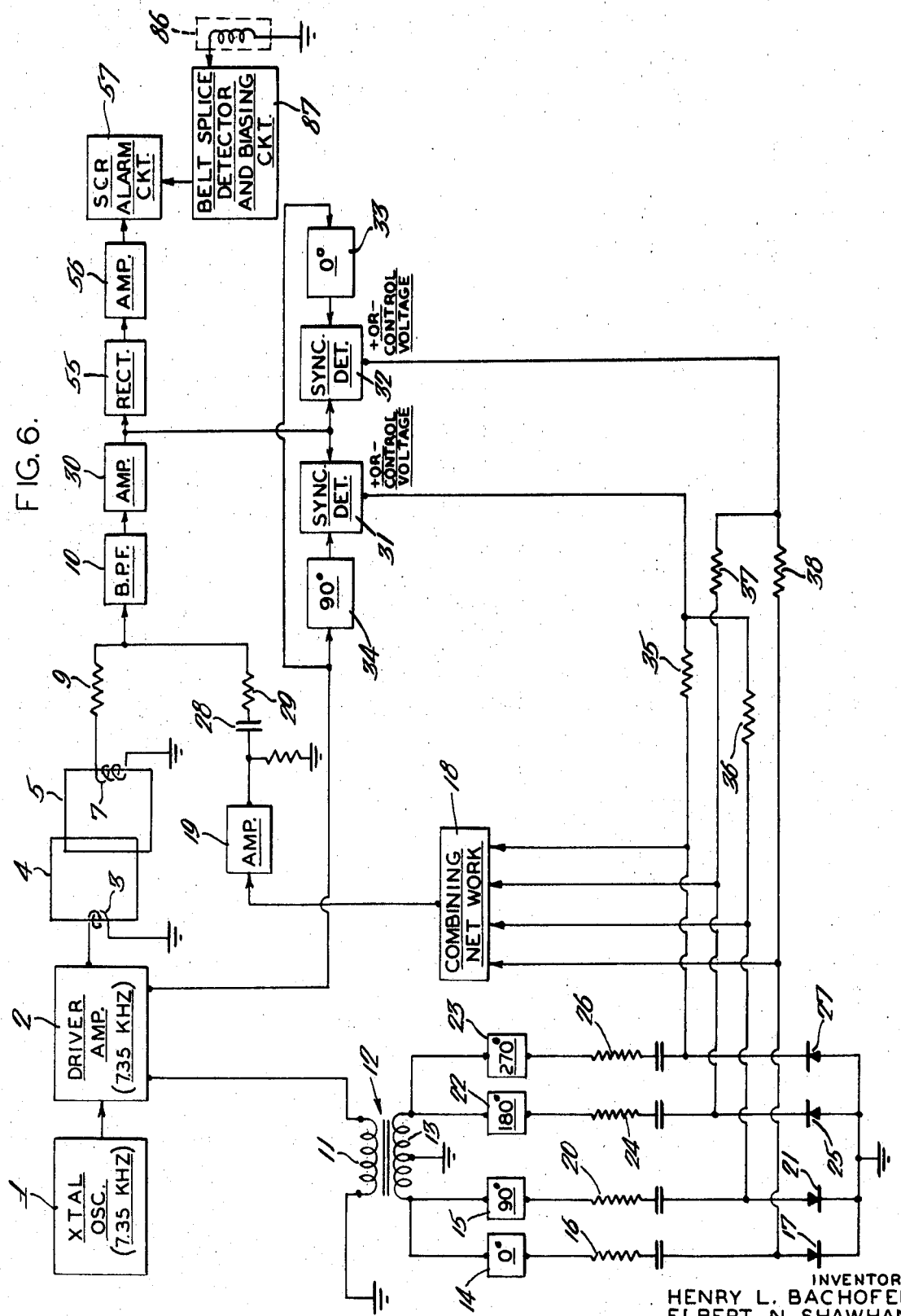
Figure 7:
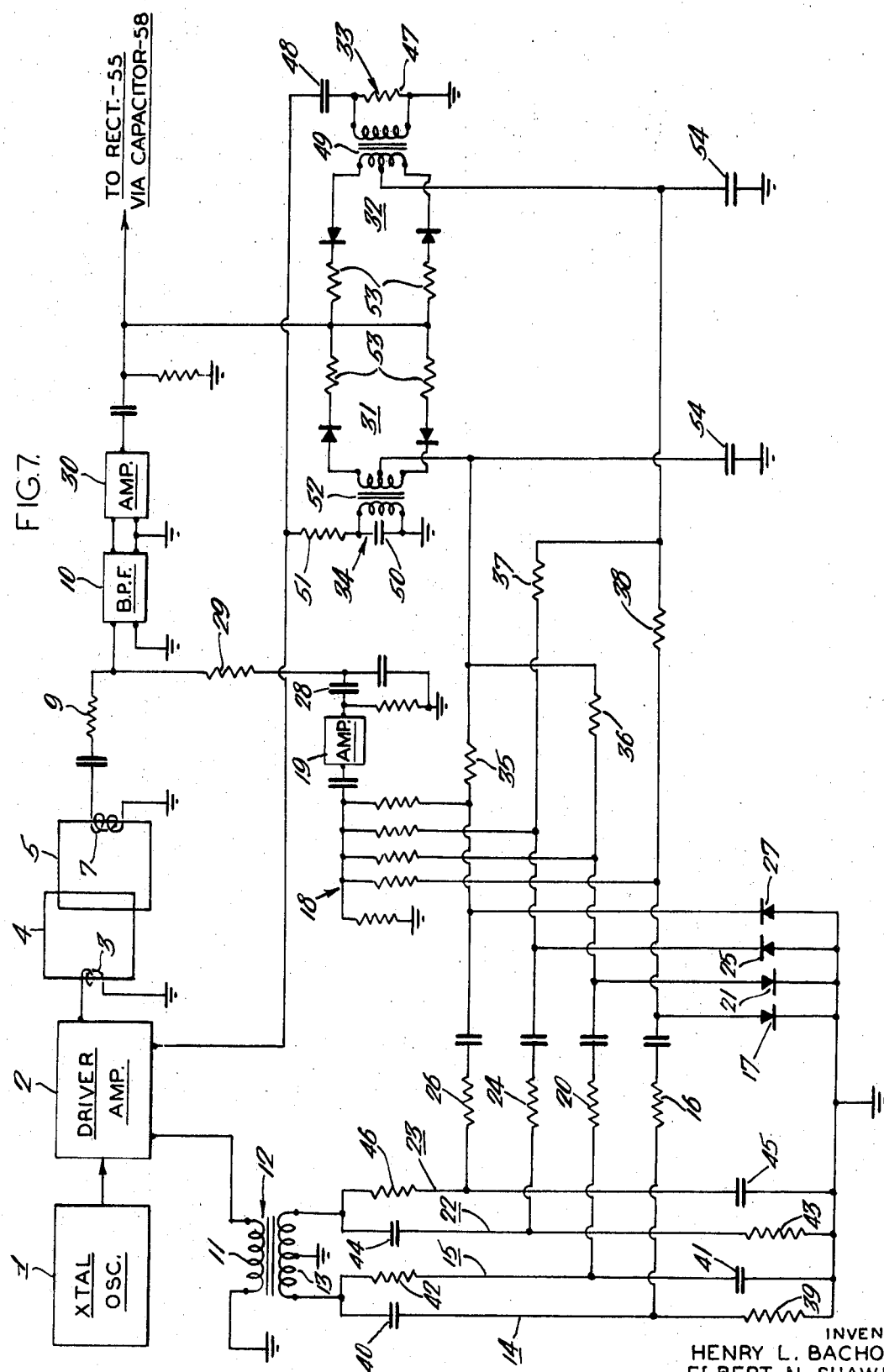

FIGS. 3—5 are views illustrating the belt-loop arrangement utilized in the invention;

FIG. 6 is a combined detailed and block diagram of the circuitry utilized in the invention;

FIG. 7 is a schematic diagram of the self-balancing circuit of the invention; and FIG. 8 is a schematic diagram of the alarm and belt splice compensator circuits of the invention.

Refer first to FIG. 1. The sensing portion of the apparatus (i.e., the portion of the apparatus which is associated with the conveyor belt) comprises three coils, an excitation coil 4 and two pickup coils 5 and 6. Each of these coils is in the form of a rectangular one-turn loop formed from four lengths of three-inch aluminum I-beam, welded or rigidly bolted at the corners to form a rectangle typically 3 feet by 4 ½feet in size. This construction provides rigid coils of ample size, highly resistant to vibration and shock.

The loops described are coupled to the external circuitry to be described hereinafter by means of individual toroidal coils, each coil being wound on a toroidal core which surrounds an I-beam of each respective rectangle. The excitation coil 3 is wound on a toroidal core which surrounds one I-beam of loop 4, one pickup coil 7 is wound on a toroidal core which surrounds one I-beam of loop 5, and the other pickup coil 8 is wound on a toroidal core which surrounds one I-beam of loop 6.

The ends of coil 3 are connected to the high-level output of an amplifier which is driven by a fixed-frequency source such as a crystal oscillator, thereby to supply oscillatory energy of fixed frequency to the loop 4. The pickup coils 7 and 8 are connected in series-aiding relation with reference to an external flux passing through the loops 5 and 6, and the remaining two ends of these coils are connected to supply an input signal to the circuitry illustrated in FIG. 6. The pickup loops 5 and 6 overlap the excitation loop 4 to a certain extent, but the pickup loops are placed on respective opposite sides of the critical coupling position (indicated by the dotted line A) with respect to the excitation coil.

Now refer to FIG. 2, which is a graph representing the amplitude and relative sense of the net flux (from the excitation loop) passing through a pickup loop, versus amount of overlap. At the critical coupling position, there is zero net flux through the pickup loop; on either side of this critical coupling position, the net fluxes are opposite in sense. Since in FIG. 1 the pickup loops 5 and 6 are on respective opposite sides of the critical coupling position A, the net fluxes (from the excitation loop 4) through the two pickup loops are opposite in sense. Therefore, the direct pickup from the excitation loop 4 tends to cancel in the pickup loops 5 and 6; however, the effects of an external flux through the pickup loops add, due to the series-aiding connection of the coils 7 and 8.

FIGS. 3, 4, and 5 are somewhat diagrammatic views illustrating the three coils or loops previously described as they would be associated with a conveyor belt, to detect metallic bodies traveling along such belt; FIG. 3 is a diagrammatic side elevation, FIG. 4 is an end elevation of the belt-loop arrangement, and FIG. 5 is a top or plan view of the arrangement.

FIG. 3 illustrates diagrammatically the loops 4, 5, and 6 operatively related to the conveyor belt 77, which is shown in side elevation. The direction of travel of the belt is as indicated. The loops 4, 5, and 6 are all located in horizontal planes at a distance of about 3 feet above the belt, with the 3 foot dimension of the loops extending parallel to the direction of belt travel. As in FIG. 1, the pickup loops 5 and 6 overlap the excitation loop 4, being on respective opposite sides of the critical coupling position A. For simplification, the toroidal coupling coils for the loops are not illustrated in FIG. 3.

FIGS. 4 and 5 illustrate the manner of supporting the loop assembly in position above the conveyor belt. The three hollow aluminum rectangles 4, 5, and 6 are joined together as an assembly by strips 88 of phenolic resin (e.g., 1 inch thick strips) bolted on the sides of the three I-beam frames (loops), the bolt holes being slotted to permit accurate adjustment of position of the three rectangular loops. It will be appreciated that the 4 ½foot dimension of the rectangular loops extends in the horizontal direction in FIG. 4. As shown in FIG. 4, the conveyor belt 77 is somewhat dished, seen in end elevation.

The conveyor belt structure conventionally includes fixed side rails 89. Mounting brackets 90 (shown as four in number, two on each side; see FIG. 5) are bolted to the tops of the two side rails and to the side plates 88, to rigidly support the loop assembly 4, 5, 6 in position above the belt 77.

Now refer to FIG. 6, which is a combined block and schematic circuit diagram (simplified) of the metal detecting apparatus of this invention. As previously described, an excitation coil and two pickup coils are used; for simplification of the illustration, however, only one pickup coil is shown in FIG. 6. As previously stated, the pickup from the excitation coil tends to cancel in the two pickup coils, while the effects of an external flux through these two latter coils add. The residual direct pickup from the excitation coil is reduced to a minimum level by means of a bucking voltage which is automatically adjusted in phase and amplitude; this bucking voltage is algebraically added to the output voltage of the pickup coils, to produce a resultant output voltage. The automatic adjustment of the phase and amplitude of the bucking voltage are accomplished by means of a self-balancing circuit.

The output of a crystal oscillator 1, operating for example at a frequency of 7.35 kHz. is amplified by a driver amplifier 2 of conventional type, such as a commercially-available solid-state (all-silicon-transistor) public address (PA) or booster type of amplifier. A portion of the high-level output of this amplifier is fed to the toroidal coil 3 which surrounds the one-turn excitation loop 4; thus, this portion of the amplifier output is used as excitation current for coil 4. The pickup loops 5 and 6 (loop 5 being illustrated in FIG. 6) overlap the excitation loop 4, as previously described; one end of the toroidal coil 7 (in reality, this would be one free end of the series-connected toroidal coils 7 and 8, which respectively surround the pickup loops 5 and 6) is connected to ground, and the other free end of the toroidal coil combination is connected through a resistor 9 to the input of a band pass filter 10.

A bucking voltage to cancel the unbalance in the pickup coils 5 and 6 (which is to say, in the coils 7 and 8, which latter serve mainly as current transformers, coupled to the respective one-turn loops) is generated by adding components in each of the four quadrants. These quadrature-related voltages are obtained from the driver amplifier 2. A low-level output is taken from amplifier 2 and fed to the primary winding 11 of a transformer 12 which has a centertapped secondary winding 13. The secondary centertap is grounded, and at one end of winding 13 the voltage is fed through two paralleled but oppositely-arranged RC networks 14 and 15 (detailed hereinafter) to provide respective voltages of 0° and 90° phase. The resistor 16 in series with the diode 17 forms a voltage divider which determines the amplitude of the 0° component applied to a combining network 18 for summing with the other three components; the combining network 18 is located at the input of an amplifier 19. The resistor 20 in series with the diode 21 forms a voltage divider which determines the amplitude of the 90° component applied to the combining network 18 for summing with the other three components. The diodes 17 and 21 function as voltage-controlled resistors, in a manner which will be described hereinafter.

At the other end of winding 13, the voltage is fed through two paralleled but oppositely-arranged RC networks 22 and 23 to provide respective voltages of 180° and 270° phase. The resistor 24 in series with the diode 25 forms a voltage divider which determines the amplitude of the 180° component applied to the combining network 18 for summing with the other three components. The resistor 26 in series with the diode 27 forms a voltage divider which determines the amplitude of the 270° component applied to the combining network 18 for summing with the other three components. The diodes 25 and 27 also function as voltage-controlled resistors.

The four quadrature-related voltages (derived from amplifier 2, and individually controlled in amplitude by means of the controlled diodes 17, 21, 25, and 27) are summed or combined by means of network 18, and the resultant is amplified by amplifier 19. The output of amplifier 19 (which is the bucking voltage previously referred to, automatically adjusted in phase and amplitude as will be described subsequently) is fed through a capacitor 28 and a resistor 29 to the input of filter 10, at which point it is algebraically added to the unbalance voltage (induced in pickup coil 7). The algebraic sum is filtered by filter 10, to remove any harmonics generated in the coils 5 and 6 (or 7 and 8), or any harmonics due to the nonlinearity of the diodes 17, 21, 25, and 27.

The net voltage (output of filter 10) is amplified in an amplifier 30, and is then rectified in two synchronous detectors or rectifiers 31 and 32, each of which is analogous to a so-called phase detector. These synchronous rectifiers 31 and 32 are driven by voltages obtained from the driver amplifier 2 and displaced 90° in phase from each other. A high-level output is taken from amplifier 2 and fed through two paralleled but oppositely-arranged RC networks 33 and 34 to provide respective voltages of 0° and 90° phase. The 0° phase voltage drives synchronous detector 32 and the 90° phase voltage drives synchronous rectifier 31. An output voltage (control voltage), which may be either positive or negative depending upon the sense of the net of resultant voltage at the input of filter 10, is taken from detector 31 and is applied through a resistor 35 to the 270° diode 27, and also through a resistor 36 to the 90° diode 21. An output voltage (control voltage), which may be either positive or negative depending upon the sense of the net or resultant voltage at the input of filter 10, is taken from detector 32 and is applied through a resistor 37 to the 180° diode 25, and also through a resistor 38 to the 0° diode 17.

In operation, for any particular unbalance in the pickup coils 7 and 8 (i.e., for any particular resultant voltage at the input of filter 10), two of the four diodes 17, 21, 25, and 27 in the bucking voltage amplitude adjusting circuit become conducting; which two conduct depends on the polarities of the synchronous detector outputs (plus or minus control voltages). Bucking voltage (phase-quadrature) components (derived from the driver amplifier 2, by way of transformer secondary 13) corresponding to the conducting diodes are lower in amplitude than the other two, and are controlled by the magnitudes of the control voltages from the detectors 31 and 32. Equilibrium is established when the net or resultant voltage at the input of filter 10 is a minimum. Thus, the phase and amplitude of the summed or resultant bucking voltage (the output of network 18) are automatically adjusted by means of the self-balancing circuit described (including the synchronous detectors 31 and 32, the diodes 17, 21, 25 and 27, etc.) in such a way as to reduce the net or resultant output voltage of the pickup coils (i.e., the voltage at the input of filter 10) to a minimum value.

Refer now to FIG. 7, which is a detailed schematic of the self-balancing circuit. The quadrature-related components for the bucking voltage are developed by means of the networks 14, 15, 22, and 23, each of which comprises the series combination of a resistor and a capacitor. Each causes a 45° phase lag across the capacitor, relative to the input voltage. The 0° network 14 comprises a resistor 39 in series with a capacitor 40, the voltage across resistor 39 being taken off for the voltage divider 16, 17. The 90° network 15 comprises a capacitor 41 in series with a resistor 42, the voltage across capacitor 41 being taken off for the voltage divider 20, 21. The 180° network 22 comprises a resistor 43 in series with a capacitor 44, the voltage across resistor 43 being taken off for the voltage divider 24, 25. The 270° network 23 comprises a capacitor 45 in series with a resistor 46, the voltage across capacitor 45 being taken off for the voltage divider 26, 27.

The two networks 33 and 34, for providing the two quadrature-related driving voltages for the respective synchronous detectors 32 and 31, each comprise the series combination of a resistor and a capacitor, similarly to networks, 14, 15, 22, and 23 previously described. The 0° network 33 comprises a resistor 47 in series with a capacitor 48, the voltage across resistor 47 being taken off for application to the synchronous detector 32 by way of an input transformer 49. The 90° network 34 comprises a capacitor 50 in series with a resistor 51, the voltage across capacitor 50 being taken off for application to the synchronous detector 31 by way of an input transformer 52.

The time required for the self-balancing circuit to balance is determined by the series resistors 53 and the shunt or storage capacitors 54 associated with the synchronous detectors 31 and 32. This time constant is made about 0.5 second, to allow time for full response to a metallic body traveling at belt speed past the pickup coils 5 and 6.

When a metallic body momentarily enters the field of the excitation coil 4, eddy currents are induced in the metal, thus creating a field and inducing a signal voltage in the pickup coils 7 and 8. If the metal is ferrous, there is an additional voltage component, due to distortion of the excitation field as a result of the change in permeability.

The time constant of the self-balancing circuit previously described is chosen so that a piece of metal on the belt, moving at the known speed of the belt (e.g., about 13 feet per second) past the pickup coils 5 and 6, causes a net signal in the pickup coils 5 and 6 (or 7 and 8). That is to say, when a metallic body passes the coils at the speed of the belt, the self-balancing circuit cannot respond in time to cancel (by means of the bucking voltage) the unbalance voltage across the pickup coils 7 and 8, and a net voltage appears at the input of the band pass filter 10. This voltage is amplified by amplifier 30 and rectified by a rectifier 55 which is coupled to the output of amplifier 30.

If the metallic body remains in the field of the excitation coil for an interval longer than the time constant of the self-balancing circuit (such a condition arising, for example, as a result of metal moving in the vicinity of the belt, or as a result of mechanical flexing of the coils 4, 5, or 6), the resulting signal voltage induced in the pickup coils is cancelled by the self-balancing circuit, which automatically adjusts the amplitude and phase of the bucking voltage in a manner appropriate to effect such cancellation.

When a metallic body passes the coils at the speed of the belt, a net (uncancelled) voltage appears at the input of the band pass filter 10, and this voltage is amplified at 30 and rectified at 55 to produce a DC pulse. This DC pulse is amplified further by means of an amplifier 56 and is then applied to a Silicon Control Rectifier (SCR) alarm circuit 57.

Now refer to FIG. 8, which is a detailed circuit diagram of the alarm circuit portion of the apparatus, together with other circuits directly associated therewith. Rectifier 55 is coupled to the output of amplifier 30 by way of a capacitor 58. The DC pulse produced by rectifier 55 is passed through a broad band pass filter which rejects signals much slower or faster than a signal from a metallic body moving at belt speed (the fast signals might arise, for example, as a result of vibration or shock). The series resistor 59 and the bypass capacitor 60 set the upper frequency limit of the broad band pass filter referred to. The large series capacitor 61 and the resistance of the sensitivity control potentiometer 62 set the lower frequency limit of the broad band pass filter. The sensitivity control potentiometer 62 adjusts the level of the pulse required to fire the SCR 63, after further amplification in amplifier 56.

The coil 64 of a relay 65 is normally energized (thereby picking up this relay) by the flow of current from a positive DC source through a series resistor 66 and a pair of latching contacts 67 which are closed when the relay picks up. In this connection, it is pointed out that the negative terminal of the DC source referred to is grounded. Relay 65 is therefore illustrated in the energized or picked-up condition. When the level of the signal (amplified DC pulse) appearing at the output of amplifier 56 is sufficient to overcome the bias applied through a resistor 68 to the SCR 63 (one means for applying such a bias will be described hereinafter), the SCR is fired. This causes a flow of current from the DC source, through resistor 66, a pair of relay contacts 69 which are closed when the relay is picked up, and the anode-cathode path of the SCR 63 to ground. The increased current flow through resistor 66 then causes the voltage across the relay coil 64 to decrease, and relay 65 drops out, that is, becomes deenergized. The dropping out of the relay 65 opens its contacts 69, which breaks the circuit to the SCR 63; the SCR is then ready to be fired again.

After the SCR 63 has been fired, the alarm circuit 57 is not armed until the manual reset button 70 is pressed, to establish an energization circuit through the relay coil 64. This energizes or picks up the relay 65, reclosing its latching contacts 67 (which thereby hold the relay picked up), and reclosing the contacts 69, which reestablish the connection to the SCR 63.

When the relay 65 drops out, a pair of contacts 71 are closed. This completes a circuit from the AC power line through a counter coil 72, a neon lamp 73, and a diode rectifier 74; the counter is then advanced one step and the lamp 73 is lighted. When the reset button 70 is pressed, relay 65 is picked up, opening the contacts 71 and extinguishing the lamp 73. This indicates that the circuit is properly armed for the next signal.

The remaining set of relay contacts (comprising a pair of contacts 75 which are closed when the relay 65 is picked up, and a pair of contacts 76 which are closed when the relay drops out) serve as alarm contacts, which can be used to operate an external alarm or to operate a contactor which stops the belt. The overall response time of the apparatus of this invention, to a metallic body traveling at belt speed past the pickup loops 5 and 6, is such that the body is detected, and an alarm given, before any irremediable damage to the belt can take place.

The reinforcing cables in the belt normally do not cause a net signal to appear at the input of band pass filter 10, because their position relative to the pickup coils changes only slowly; such slow signals are cancelled by the self-balancing circuit previously described. However, at splices and patches in the belt, these reinforcing cables are spaced at double density. When a patch or reinforced splice passes the coils, there is an abrupt rise in the signal voltage output of the pickup loops as the leading edge passes under the loops, followed by an abrupt drop in signal voltage as the trailing edge passes, due to the increase in the amount of metal in the spliced or patched area; this metal is of course moving at belt speed. It is necessary to provide a splice compensating arrangement, in order to prevent an alarm being sounded in response to the passage of these patches and splices in the belt.

A belt splice pickup assembly 86, which functions in a manner similar to the magneto of a small engine, is placed under the conveyor belt 77. This assembly comprises two series-connected coils of wire 78 wound on the legs of a U-shaped soft iron core 79, with a permanent magnet 80 supplying a magnetic flux through the core. The steel reinforcing cables in the belt 77 complete the magnetic loop. With the belt 77 running, the continuous cables therein cause a substantially steady magnetic flux in the core 79, resulting in no induced voltage in the coils 78. When a splice 81 approaches the coil structure, there is twice as much metal completing the magnetic coupling of the magnet to the core, causing an increase in the magnetic flux through the core, thus inducing a voltage in the pickup coils 78. When the splice passes the coil structure, the magnetic coupling decreases to normal, causing a change of magnetic flux in the opposite direction and inducing in the coils 78 a voltage of the opposite polarity.

The voltage pulse produced in coils 78 by the leading edge of the splice 81 (resulting from the change in flux through these coils when a splice arrives thereat) is amplified in an amplifier 82, and is then applied through a capacitor 83 as a triggering pulse to a monostable (one-shot) multivibrator 84 which has an adjustable transfer time. The multivibrator output is inverted by a phase inverter 85 (typically, a solid-state device) and then applied as a bias through resistor 68 to the SCR 63 in alarm circuit 57. The time interval during which this bias is so applied depends upon the (adjustable) transfer time of multivibrator 84, and is adjusted to be slightly longer than the time required for the longest splice (the splices and patches being of known lengths) to pass the pickup loops 5 and 6.

The SCR biasing circuit described is designed to produce a voltage on the SCR 63 equal to that produced (at the output of amplifier 56) by the metal detector pickup loops 5 and 6 when the splice 81 passes them. Thus, when a splice arrives at the pickup loops 5 and 6, a bias is applied to the SCR 63 sufficient to prevent it from being fired (to thereby drop out the alarm relay 65), unless there is simultaneously present a large signal from a piece of tramp metal being carried by the belt 77.

As previously stated, the bias timer (the transfer time of multivibrator 84, which is adjustable) is set to permit the longest splice to pass the metal detector pickup loops 5 and 6. Normal operation is resumed after the timed interval, by the multivibrator 84 reverting to its original condition, thereby to remove the bias applied to the SCR 63. The metal detecting circuit is not inoperative during the timed interval (passage of splice), but its sensitivity is somewhat reduced.

Since the belt splice compensating arrangement 87 (which functions as a belt splice detector and biasing circuit, producing a bias on the SCR 63) must operate before the metal detector can sound an alarm, the pickup assembly 86 thereof is positioned slightly ahead of the metal detector pickup loops 5 and 6, with reference to the direction of travel of the belt 77.

We claim:

1. Apparatus for detecting the fortuitous presence of a metallic body traveling at a known rate through a detection zone, comprising an excitation coil for setting up an alternating magnetic field in said zone, means for supplying an alternating excitation current to said coil, a pickup coil means in said zone, the entry of a metallic body into said field resulting in the setting up of eddy currents in such body and the consequent inducing of a signal voltage in said pickup coil means; means for establishing an alternating bucking voltage controllable in phase and amplitude and of the same frequency as said excitation current, means for algebraically adding said bucking voltage to the voltage induced in said pickup coil means to produce a resultant voltage, means responsive to said resultant voltage for automatically controlling the phase and amplitude of said bucking voltage to maintain said resultant voltage at a minimum, said last-mentioned means having a time constant in excess of the time required for a metallic body, moving at said rate, to travel through said zone; and an indicating circuit responsive to said resultant voltage.

2. Apparatus in accordance with claim 1, wherein said pickup coil means comprises a pair of coils connected in series-aiding relationship and positioned in overlapping relation with respect to said excitation coil but on respective opposite sides of the critical coupling position with respect thereto.

3. Apparatus in accordance with claim 1, wherein said alternating bucking voltage establishing means comprises means coupled to said alternating excitation current supplying means for deriving from such current four voltages in phase quadrature, and separate voltage-controllable means for determining the amplitude of each of said quadrature voltages fed to a summing means to provide said bucking voltage.

4. Apparatus as defined in claim 3, wherein said phase and amplitude controlling means comprises means responsive to said resultant voltage for producing a pair of control voltages whose polarities and magnitudes depend upon the relative phase and magnitude of said resultant voltage, and means for applying said control voltages to said voltage-controllable means.

5. Apparatus as defined in claim 3, wherein said phase and amplitude controlling means comprises a pair of synchronous rectifiers for rectifying said resultant voltage, means for driving said rectifiers respectively by two voltages of the same frequency as said excitation current and in phase quadrature with respect to each other, and means for applying the output voltages of said rectifiers as control voltages to said voltage-controllable means.

6. Apparatus according to claim 5, wherein said time constant is provided by series resistors and shunt capacitors connected in the circuits of said synchronous rectifiers.

7. An apparatus for detecting the fortuitous presence of a metallic body moving along a metallically-reinforced conveyor belt known-length portions of which are nonuniform as to the amount of metal contained therein, comprising an excitation coil for setting up an alternating magnetic field in a zone located along the length of said belt, means for supplying an alternating excitation current to said coil, a pickup coil means in said zone, the entry of a metallic nonuniformity into said field resulting in the inducing of a signal voltage in said pickup coil means; an indicating circuit of controllable sensitivity responsive to a voltage induced in said pickup coil means, means positioned adjacent said zone for detecting the approach of a metallic nonuniformity to said zone and for producing a voltage in response thereto, and means for utilizing said last-mentioned voltage to reduce the sensitivity of said indicating circuit while still permitting fortuitously-present metallic bodies to be indicated by said circuit.

8. Apparatus in accordance with claim 7, wherein said last-mentioned means operates to reduce the sensitivity of said indicating circuit to a degree commensurate with the amplitude of said signal voltage, thereby to prevent operation of said indicating means in response to said signal voltage.

9. Apparatus in accordance with claim 7, wherein said last-mentioned means has incorporated therein a time delay such as to maintain the sensitivity of said indicating circuit reduced for a time interval slightly in excess of the time required for the longest metallic nonuniformity to pass said pickup coil means.

10. Apparatus in accordance with claim 7, wherein said detecting means is positioned ahead of said pickup coil means, with reference to the direction of travel of said belt.

11. Apparatus for detecting the fortuitous presence of a metallic body moving at a known rate along a metallically-reinforced conveyor belt known-length portions of which are nonuniform as to the amount of metal contained therein, comprising an excitation coil for setting up an alternating magnetic field in a zone located along the length of said belt, means for supplying an alternating excitation current to said coil, a pickup coil means in said zone, the entry of any nonuniform metallic body into said field resulting in the inducing of a signal voltage in said pickup coil means; means for establishing an alternating bucking voltage controllable in phase and amplitude and of the same frequency as said excitation current, means for algebraically adding said bucking voltage to the voltage induced in said pickup coil means to produce a resultant voltage; means responsive to said resultant voltage for automatically controlling the phase and amplitude of said bucking voltage to maintain said resultant voltage at a minimum, said last-mentioned means having a time constant in excess of the time required for a nonuniform metallic body, moving at said rate, to travel through said zone; an indicating circuit of controllable sensitivity responsive to said resultant voltage, means positioned adjacent said zone for detecting the approach of one of said metallic nonuniformities to said zone and for producing a voltage in response thereto, and means for utilizing said last-mentioned voltage to reduce the sensitivity of said indicating circuit.

12. Apparatus in accordance with claim 11, wherein said pickup coil means comprises a pair of coils connected in series-aiding relationship and positioned in overlapping relation with respect to said excitation coil but on respective opposite sides of the critical coupling position with respect thereto.

13. Apparatus in accordance with claim 11, wherein said alternating bucking voltage establishing means comprises means coupled to said alternating excitation current supplying means for deriving from such current four voltages in phase quadrature, and separate voltage-controllable means for determining the amplitude of each of said quadrature voltages fed to a summing means to provide said bucking voltage.

14. Apparatus in accordance with claim 11, wherein said last-mentioned means operates to reduce the sensitivity of said indicating circuit to a degree commensurate with the amplitude of a signal voltage induced in said pickup coil means due to the entry of one of said metallic nonuniformities into said field, thereby to prevent operation of said indicating means in response to said last-mentioned signal voltage.

15. Apparatus in accordance with claim 11, wherein said last-mentioned means has incorporated therein a time delay such as to maintain the sensitivity of said indicating circuit reduced for a time interval slightly in excess of the time required for the longest one of said metallic nonuniformities, moving at said rate, to pass said pickup coil means.

UNITED STATES PATENT OFFICE
CERTIFICATE OF CORRECTION

Patent No. 3,573,784     Dated  April 6, 1971

Inventor(s)     Henry L. Bachofer et al.

It is certified that error appears in the above-identified patent and that said Letters Patent are hereby corrected as shown below:

On the cover sheet insert [73] Assignee Great Canadian Oil Sands Limited, Toronto, Canada, a corporation of Canada --.

Signed and sealed this 7th day of December 1971.

(SEAL)
Attest:

EDWARD M. FLETCHER, JR.          ROBERT GOTTSCHALK
Attesting Officer                Acting Commissioner of Pate